United States Patent [19]

Allen

[11] Patent Number: 4,876,307

[45] Date of Patent: Oct. 24, 1989

[54] POLYMER PROCESSING

[75] Inventor: Robert C. Allen, Houston, Tex.

[73] Assignee: Shell Oil Company, Houston, Tex.

[21] Appl. No.: 170,593

[22] Filed: Mar. 18, 1988

Related U.S. Application Data

[62] Division of Ser. No. 107,192, Oct. 13, 1987, Pat. No. 4,761,453.

[51] Int. Cl.$^4$ ............................................. C08J 0/00
[52] U.S. Cl. ...................................... 524/612; 528/392
[58] Field of Search .......................... 524/612; 528/392

[56] References Cited

U.S. PATENT DOCUMENTS

| | | | |
|---|---|---|---|
| 2,495,283 | 1/1950 | Werntz | 524/612 |
| 2,495,285 | 1/1950 | Hoehn | 524/612 |
| 2,495,286 | 1/1950 | Brubaker | 528/392 |
| 3,694,412 | 9/1972 | Nozaki | 528/392 |
| 3,929,727 | 12/1975 | Russell et al. | 524/612 |
| 3,968,082 | 7/1976 | Hudgin | 524/612 |
| 3,984,388 | 10/1976 | Shryne et al. | 528/392 |
| 4,024,325 | 5/1977 | Hudgin | 528/392 |
| 4,024,326 | 5/1977 | Hudgin | 528/392 |
| 4,076,911 | 2/1978 | Fenton | 528/392 |
| 4,192,942 | 3/1980 | Mainord | 528/392 |
| 4,687,805 | 8/1987 | White | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 1081304 | 3/1965 | United Kingdom . |

OTHER PUBLICATIONS

Frushour, Polymer Bulletin, vol. 4, pp. 305-314 (1981).
Frushour, Polymer Bulletin, vol. 7, pp. 1-8 (1982).
Frushour, Polymer Bulletin, vol. 11, pp. 375-382 (1984).

*Primary Examiner*—Joseph L. Schofer
*Assistant Examiner*—J. M. Reddick
*Attorney, Agent, or Firm*—Dean F. Vance

[57] ABSTRACT

Plasticized compositions exhibiting enhanced thermal processability are produced by substantially saturating a linear alternating polymer of carbon monoxide and at least one ethylenically unsaturated hydrocarbon with water at the melting point of the plasticized composition.

9 Claims, No Drawings

POLYMER PROCESSING

This is a division of application Ser. No. 107,192 filed Oct. 13, 1987, now U.S. Pat. No. 4,761,453.

FIELD OF THE INVENTION

This invention relates to improved processing of polyketone polymers at elevated conditions. More particularly it relates to an improved method of processing polyketone polymer and to plasticized compositions comprising polyketone polymer substantially saturated with a plasticizing amount of water.

BACKGROUND OF THE INVENTION

The class of polymers of carbon monoxide and olefin(s) has been known for a number of years. Brubaker, U.S. Pat. No. 2,495,286 produced such polymers of relatively low carbon monoxide content in the presence of free radical catalysts, e.g., peroxy compounds. U.K. No. 1,081,304 produced similar polymers of increased carbon monoxide content in the presence of alkylphosphine complexes of palladium salts as catalyst. Nozaki extended this process through the use of arylphosphine complexes of palladium salts and certain inert solvents, e.g., U.S. Pat. No. 3,694,412.

More recently, the class of linear alternating polymers of carbon monoxide and at least one ethylenically unsaturated hydrocarbon, e.g., ethylene or ethylene and propylene, has become of greater interest because, in part, of the availability of such materials. The polymers have been shown to be of the formula —CO(A)— where A is the moiety of ethylenically unsaturated hydrocarbon polymerized through the ethylenic unsaturation. For example, when the ethylenically unsaturated hydrocarbon is ethylene, the polymer will be represented by the formula $+CO-CH_2-CH_2+$. The general process for the production of these linear alternating polymers is illustrated by published European Patent Application Nos. 121,965 and 181,014. The process generally involves a catalyst composition formed from a Group VIII metal selected from palladium, cobalt or nickel, the anion of a non-hydrohalogenic acid having a pKa below 2 and a bidentate ligand of phosphorus, arsenic or antimony. The resulting polymers are relatively high molecular weight thermoplastic polymers having utility in the production of structural articles such as containers for food and drink and parts for the automobile industry.

The polyketones are characterized by relatively high melting points, generally over 175° C., depending on the molecular weight and the chemical nature of the polymer. A melting point of this magnitude is of value in many applications, e.g., where a shaped article is to be subjected to conditions of elevated temperature. From a processing point of view, however, the high melting point is detrimental since additional energy is required to effect changes in the shape of a polymer article and sufficiently elevated temperatures cause some degree of thermal degradation.

The processing temperature of a polymer is often lowered through the production of a plasticized composition, that is, lowering a melting point through the formation of a composition comprising the polymer and a plasticizing agent. The resulting composition will have a melting point lower than the unplasticized polymer. However, once a plasticizing agent has been incorporated into a polymer, it is not generally possible to easily remove the plasticizing agent and return the polymer to the unplasticized state where the higher melting point is observed. It would be of advantage to produce plasticized compositions of polyketone polymers which exhibit greater processability at a comparatively lower temperature. It would also be of advantage to provide a composition which incorporates a plasticizer which, subsequent to processing, may be removed to regenerate the unplasticized composition.

SUMMARY OF THE INVENTION

This invention relates to the processing of polyketone polymers. More particularly, it relates to a method of more easily processing polyketone polymer through the use of water as a processing aid. When water is used to substantially saturate a polyketone polymer at elevated temperature, a plasticized composition is produced of reduced melting point, relative to the non-plasticized polymer. Increased ease of processing at elevated temperature is observed for a polymer which is substantially saturated at the melting point of the substantially saturated, (i.e., plasticized), polymer. Reduction of the degree of saturation of the polymer subsequent to processing restores the original melting point to the resulting non-plasticized polymer.

DESCRIPTION OF THE INVENTION

The polymers which are processed according to the process of the invention are the linear alternating polymers of carbon monoxide and at least one ethylenically unsaturated hydrocarbon often referred to as polyketones. Suitable ethylenically unsaturated hydrocarbons have from 2 to 20 carbon atoms inclusive, preferably from 2 to 10 carbon atoms inclusive, and are aliphatic such as ethylene and other α-olefins including propylene, butene-1, octene-1 and dodecene-1, or are arylaliphatic containing an aryl substituent on an otherwise aliphatic molecule, particularly an aryl substituent on a carbon atom of the ethylenic unsaturation. Illustrative of this latter class are styrene, p-methylstyrene, p-ethylstyrene and m-methylstyrene. Preferred polyketone polymers are copolymers of carbon monoxide and ethylene or terpolymers of ethylene and a second α-olefin, of greater than 3 carbon atoms, i.e. from 3 to 20 carbon atoms inclusive, particularly propylene.

Of particular interest are those polymers of molecular weight from about 1,000 to about 200,000, particularly those of molecular weight from about 10,000 to about 50,000, and containing substantially equimolar quantities of carbon monoxide and unsaturated hydrocarbon.

Such polymers are produced by contacting carbon monoxide and the ethylenically unsaturated hydrocarbon(s) under polymerization conditions in the presence of a catalytic amount of a catalyst formed from a compound of the Group VIII metals palladium, cobalt or nickel, an anion of a non-hydrohalogenic acid having a pKa less than about 6, preferably less than about 2, and a bidentate ligand of phosphorus, arsenic or antimony. Although the scope of the polymerization process is extensive, for purposes of illustration the preferred Group VIII metal compound is palladium acetate, the preferred anion is an anion of trifluoroacetic acid or para-toluenesulfonic acid and the preferred bidentate ligand is 1,3-bis(diphenylphosphino)propane.

Polymerization is typically carried out at elevated temperature and pressure and in the gaseous phase or in the liquid phase in the presence of an inert diluent, particularly a lower alkanol such as methanol or ethanol. The reactants are contacted by conventional methods such as shaking or stirring and subsequent to reaction the polymer product is typically recovered by filtration or decantation. The polymer product may contain residues of the catalyst which are removed, if desired, by treatment with a solvent which is selective for the residues. Production of this class of polymers is illustrated, for example, by published European Patent Application Nos. 121,965 and 181,965.

The physical properties of the polyketone polymers will depend in part upon the molecular weight, whether the polymer is a copolymer or a terpolymer and the relative proportion of any second hydrocarbon monomer. Typical melting points vary from about 175° C. to about 300° C. the structure of the preferred polymers is that of a linear alternating polymer of carbon monoxide and unsaturated hydrocarbon, e.g., ethylene or ethylene and propylene. The polymer will contain substantially one carbon monoxide moiety for each moiety of unsaturated hydrocarbon. When terpolymers of carbon monoxide, ethylene and a second hydrocarbon, i.e., a hydrocarbon of at least 3 carbon atoms, are produced there will be at least 2 units incorporating a moiety of ethylene per unit incorporating a moiety of the second hydrocarbon, preferably from about 10 to about 100 units incorporating a moiety of ethylene per unit incorporating a moiety of the second hydrocarbon. The polymer chain of the preferred class of polymers is thus illustrated by the formula

wherein B is the moiety obtained by polymerization of the second hydrocarbon through the ethylenic unsaturation. The —CO—(CH$_2$—CH$_2$)— units and the —CO(B)— units are found randomly throughout the polymer chain and the ratio of y:x is no more than about 0.5. In the modification of the invention which employs copolymers of carbon monoxide and ethylene without the presence of a second ethylenically unsaturated hydrocarbon, the polymers are represented by the above formula wherein y=0. When y is other than 0, i.e., terpolymers are employed, ratios of y:x from about 0.01 to about 0.1 are preferred.

The plasticized compositions of the invention are produced by maintaining the polymer in contact with water at elevated temperature until the polymer has become at least substantially saturated with water at the temperature at which the substantially saturated polymer melts. As used herein, a substantially saturated polymer is at least about 75% saturated with water, preferably at least about 95% saturated with water. The method of contacting the polymer particles with water is not critical so long as the polymer becomes substantially saturated with water vapor at elevated temperatures. Contact of the polymer with liquid water at temperatures where water is normally liquid does not produce plasticized compositions of sufficiently reduced melting point even though substantially saturated. However, saturation of the polymer with water vapor, i.e., steam, at elevated temperatures, serves to produce compositions whose melting points are markedly lower than the unplasticized polymer. The compositions substantially saturated with water at the melting point of the composition will have a melting point as much as from about 30° C. to about 70° C. lower than non-saturated polymer or even more in some instances. Without wishing to be bound by any particular theory, it appears that water vapor is able to substantially saturate at least any amorphous portion of the polymer and reach equilibrium with the crystalline portion of the polymer at a temperature below the melting point of the polymer and will thereby produce plasticized compositions of reduced melting point, relative to the polymer, if substantially saturated at that reduced melting point.

The physical nature of the polymer undergoing contact with water vapor is not critical, although in general the smaller the particle size of the polymer the faster it will reach saturation and/or equilibrium with water. The process of the invention is suitable when the polymer is in a physical form no larger than the form of nibs from an extruder, e.g., about 0.25 in. in length and 0.125 in. in diameter. Smaller particles give faster but not substantially different results. Larger particles are also satisfactory but the time required for saturation is longer and the use of such larger particles is limited by practicality.

The method of providing the vapor is not critical so long as the polymer becomes substantially saturated with the water vapor at the temperature at which the substantially saturated polymer composition melts. In a preferred modification the polymer is contacted with steam at temperatures above the normal boiling point of water. Under these more energetic conditions, the substantial saturation of the polymer takes place in a relatively short time, such as, for example, the time required to gradually heat the polymer in the presence of excess water from ambient temperatures to a melting point over a matter of a few minutes, e.g., 10 to 20 minutes, during which time the water vaporizes to form steam. Thus, when polyketone polymer and sufficient water are physically mixed and gradually heated in a closed system, the initial melting point observed is that of the plasticized composition rather than that of the polymer.

The amount of water required to substantially saturate the polymer is not large, for example from about 10% to about 45% by weight based on the total composition, preferably from about 20% to about 40% by weight. The presence of additional water is not detrimental, but serves no useful purpose since once the polymer has reached saturation/equilibrium with water vapor the presence of additional water will have no beneficial effect.

The resulting plasticized composition is sufficiently stable to be processed, without substantial decomposition, one or more times at temperatures at or somewhat above the melting point of the composition but below the melting point of the unplasticized polymer. The melting point of any particular plasticized composition is relatively constant so long as the composition remains substantially saturated with water. The composition may therefore be melt processed a number of times while taking advantage of the easier melt processing made available by the reduced melting point and the resulting lessened possibility of thermal degradation.

The plasticized composition is melt processed by a number of conventional methods which involve the polymer while in a molten or nearly molten state. Such methods include injection molding, extrusion, compression molding, thermoforming, sheet extrusion and sheet casting. Such processes are conducted more easily and with lower energy requirements when the plasticized composition is employed than when the polymer is used. The plasticized composition may contain additional conventional polymer additives which are inert to the polymer and the water vapor plasticizer such as blowing agents, mold release agents and antioxidants which are added to the polymer by blending, milling or other conventional means prior to or together with the treatment with water vapor.

Subsequent to processing, if desired, the polymer can be returned to the non-plasticized state by reducing the degree of saturation. This removal is effected by heating the plasticized composition to a temperature well above its melting point, say 20° C. to 30° C. above its melting point, i.e. to a temperature at which the polymer is no longer substantially saturated. Preferably, the composition is maintained at a reduced pressure, preferably from about 0.9 atmosphere to about 1.2 atmosphere to remove water. The original melting point of the polymer, now no longer substantially saturated, is thereby restored and enhanced physical stability at elevated temperature is observed as compared with polymer processed by normal methods. Alternatively, the plasticized composition is maintained when desired, to take advantage of continuing ease of processability or other useful properties of the plasticized composition such as enhanced modulus and toughness, as compared with the polymer in an unplasticized state. The plasticized compositions are useful in a number of applications which take advantage of these properties including the production of shaped containers for the food and drink industry and extensively shaped parts for the automotive industry. Because of the less rigorous processing requirements, the composition can be drawn into cables or extruded into structural articles for construction applications.

The invention is further illustrated by the following Illustrative Embodiments which should not be construed as limiting the invention.

ILLUSTRATIVE EMBODIMENT I

A series of experiments was conducted which employed a differential scanning calorimeter (DSC) of duPont origin to determine the melting point of polyketone polymers and plasticized compositions prepared therefrom. In this experiment, a covered pan is employed which has a pinhole in the cover. The pan and cover are placed in a chamber filled with an inert gas, typically at 800–1000 psi, and the pan and a polymer/water sample are heated while the energy requirements for continuing temperature increases is measured. By measuring, in effect, the temperature at which the energy equivalent of the heat of fusion is required to further raise the temperature of the pan contents, the melting point is determined. In a typical experiment, the pan and contents are heated past the point where the initial melting point is reached, cooled until the polymer resolidifies and then heated until melting takes place a second time. The second melting point is characteristically slightly lower than the first. In these experiments, a pressure of 800 psi of helium was maintained in the chamber and a normal heating rate of 20° C./min was maintained.

(A) A linear alternating copolymer of carbon monoxide and ethylene was produced employing a catalyst composition formed from palladium acetate, the anion of trifluoroacetic acid and 1,3-bis(diphenylphosphino)propane. The melting point of the polymer was not measured in these experiments because of limitations of the equipment, but was known to be about 257° C. Three experiments were conducted in which samples of the copolymer and water, 10 milligrams and 10 micrograms respectively, (if available) were placed in the sample pan and heated and the melting points of the resulting plasticized compositions determined by the above procedure. The results are shown in Table IA.

TABLE IA

| Run No. | First M.Pt., °C. | Second M.Pt., °C. |
| --- | --- | --- |
| 1 | 190 | 186 |
| 2 | 191 | 186 |
| 3 | 192 | 186 |

(B) A linear alternating terpolymer of carbon monoxide, ethylene and propylene was produced employing a catalyst composition formed from palladium acetate, the anion of trifluoroacetic acid and 1,3-bis(diphenylphosphino)propane. Samples of the polymer (no water) were placed in the pan and heated and the melting point of the dry polymer measured by the above procedure. The results are shown in Table IB1.

TABLE IB1

| Run No. | First M.Pt., °C. | Second M.Pt., °C. |
| --- | --- | --- |
| 1 | 221 | 219 |
| 2 | 224 | 220 |
| 3 | 223 | 223 |

Samples of this terpolymer and water, 10 milligrams and 10 micrograms respectively, were placed in sample pans and heated and the melting points of the resulting plasticized compositions were determined. The results are shown in Table IB2.

TABLE IB2

| Run No. | First M.Pt., °C. | Second M.Pt., °C. |
| --- | --- | --- |
| 1 | 169 | 164 |
| 2 | 170 | 164 |
| 3 | 168 | 164 |

ILLUSTRATIVE EMBODIMENT II

A series of melting point determinations was made by the general procedure of Illustrative Embodiment I by mixing a linear alternating terpolymer of carbon monoxide, ethylene and propylene (melting point equals 220° C.) and various amounts of water. The resulting mixtures were heated in the DSC pans until a melting point was noted. The composition of the initial mixtures and the melting point of the resulting composition are shown in Table II.

TABLE II

| Sample | % wt Polymer | % wt Water | M.Pt., °C. |
| --- | --- | --- | --- |
| 1 | 90 | 10 | 206 |
| 2 | 82 | 18 | 199 |
| 3 | 75 | 25 | 188 |
| 4 | 66 | 34 | 162 |
| 5 | 59 | 41 | 156 |
| 6 | 50 | 50 | 155 |
| 7 | 40 | 60 | 155 |

What is claimed is:

1. A method of improving the thermal processability of a linear alternating polymer of carbon monoxide and at least one ethylenically unsaturated hydrocarbon which comprises saturating said polymer with water at the melting point of the substantially saturated polymer but at a temperature below the melting point of the polymer.

2. The process of claim 1 wherein the polymer is a copolymer of carbon monoxide and ethylene.

3. The process of claim 1 wherein the polymer is a terpolymer of carbon monoxide and ethylene and propylene.

4. A method of thermally deforming a linear alternating polymer of carbon monoxide and at least one ethylenically unsaturated hydrocarbon at a temperature at which the polymer is not normally thermally deformable which comprises substantially saturating said polymer with water, at the melting point of the substantially saturated polymer but at a temperature below the melting point of the polymer, deforming the resulting polymer composition at a temperature above the melting point of the composition but below the melting point of the polymer and reducing the degree of saturation of the deformed polymer composition below substantial saturation without further deformation.

5. The method of claim 4 wherein the polymer is copolymer of carbon monoxide and ethylene or terpolymer of carbon monoxide, ethylene and propylene.

6. The method of claim 5 wherein the polymer composition is from about 10% to about 45% by weight water.

7. The method of claim 6 wherein the polymer composition is from about 20% to about 40% by weight water.

8. The method of claim 6 wherein the degree of saturation is reduced by heating the polymer composition from about 10° C. to about 30° C. above the melting point of the composition.

9. The method of claim 6 wherein the degree of saturation is reduced by maintaining the composition at a pressure from about 0.9 atmosphere to about 1.2 atmosphere.

* * * * *